United States Patent [19]

Caveney

[11] Patent Number: 4,554,733

[45] Date of Patent: Nov. 26, 1985

[54] TERMINATION TOOLING FOR APPLYING CONNECTORS TO FLAT CABLE

[75] Inventor: Jack E. Caveney, Hinsdale, Ill.

[73] Assignee: Panduit Corp., Tinley Park, Ill.

[21] Appl. No.: 470,850

[22] Filed: Feb. 28, 1983

[51] Int. Cl.[4] ..................... B23P 19/04

[52] U.S. Cl. ..................... 29/749; 29/759; 29/760

[58] Field of Search ..................... 29/749, 753, 759, 760, 29/761, 857, 861, 866, 867, 33 M, 564.1, 566.4

[56] References Cited

U.S. PATENT DOCUMENTS

| | | | |
|---|---|---|---|
| 3,956,811 | 5/1976 | Munshower | 29/753 |
| 4,020,540 | 5/1977 | Casciotti et al. | 29/749 |
| 4,035,897 | 7/1977 | Over et al. | 29/56.6 |
| 4,188,083 | 2/1980 | Knowles | 339/99 |
| 4,245,387 | 1/1981 | Reidt | 29/749 |
| 4,393,580 | 7/1983 | Hall, Jr. | 29/749 |
| 4,429,455 | 2/1984 | Roeker | 29/759 |

*Primary Examiner*—Howard N. Goldberg
*Assistant Examiner*—P. W. Echols
*Attorney, Agent, or Firm*—Charles R. Wentzel; Mark D. Hilliard

[57] ABSTRACT

Termination tooling for use with a bench press for terminating a flat cable in an elongate connector. The tooling includes a termination die and positioning structure for holding a connector in place for termination by the die. Stop structure is disposed spaced from the termination die for engaging one end of the cable with the axial direction of the cable being generally normal to the longitudinal direction of the connector so as to locate the cable end with respect to the connector. Finally, the tooling includes slide structure for supporting the cable. The slide structure is movable transversely of the axial direction of the cable between a loading position, wherein the cable engages the stop structure, and a termination position, in which the cable is positioned for termination in the connector by the die, whereby the cable is positioned with respect to the connector without the stop structure engaging the cable during termination.

17 Claims, 9 Drawing Figures

TERMINATION TOOLING FOR APPLYING CONNECTORS TO FLAT CABLE

BACKGROUND OF THE INVENTION

This invention relates to connector termination tooling and, more specifically, to tooling for use with a prime mover (such as a bench press) for terminating a flat cable with mass termination insulation displacement connectors.

Mass termination insulation displacement connectors have come into increasing use because of the great savings in the labor and time they offer in comparison with the previous method of stripping the insulation from each individual conductor and applying a crimp terminal to the bared end of each. Mass termination connectors have been specifically designed for use with a flat cable wherein a series of regularly spaced conductors are embedded in a planar sheet of insulation. Such connectors typically include an aligned base and a cover with a series of regularly spaced metallic terminal elements carried by the base and extending toward the cover. The leading end of each element is bifurcated and sharply pointed for piercing the insulation of the flat cable and engaging a corresponding conductor. The base and cover are joined at each end by a post for holding the base and cover in an insertion position so that a flat cable can be inserted between the terminal elements and the cover. Examples of such prior art flat cable connectors are illustrated in U.S. Pat. Nos. 4,106,838 and 4,188,083. These connectors can be applied adjacent the end of a length of flat cable when an end termination is desired or they can be applied intermediate the ends of the cable when a daisy chain termination is required.

Such prior art flat cable connectors are typically used with a press carrying tooling have a connector holder opposing a reciprocal ram carrying a termination die for pushing the cover and base together thereby terminating the flat cable. The desired end termination is one in which the ends of the conductor in the flat cable do not extend from the connector. This reduces the hazard of subsequent short circuits and shocks to personnel and equipment, as well as enhances the appearance of the completed termination.

One way to accomplish this is to provide a cable stop on the side of the connector holder opposite the direction of cable insertion. Trimming of the excess portion of the cable may be required after termination. Trimming is very difficult and tedious to do properly, and it may cause adjacent conductors to contact one another if the trimming is performed improperly.

Proposed termination tooling for use with a bench press includes a cable end stop and a cable clamp for retaining the cable against the clamp. The clamp and stop are mounted on a slidable table for moving the clamp, stop, connector and cable, as a unit, from a loading position to a termination position. Such tooling is suitable for terminating an end of a cable in only one orientation and, in use, requires the time consuming steps of clamping and unclamping the cable. Reference may be made to U.S. Pat. No. 4,020,540.

SUMMARY OF THE INVENTION

Among the several objects of the present invention may be noted the provision of improved tooling for use in termination of flat cable with insulation displacement mass termination connectors; the provision of such tooling which permits formation of a completed termination in which the cable end is flush or recessed with respect to the connector edge; the provision of such tooling which permits formation of a daisy chain termination closely adjacent another termination; the provision of such tooling which avoids flat cable waste; and the provision of such tooling which is fast and reliable in use, has long service life and is simple and economical to manufacture. Other objects and features of the present invention will be in part apparent and in part pointed out hereinafter in the specification and claims.

Briefly, the tooling of the present invention comprises a termination die, positioning means for holding a connector for termination by the die, stop means for locating one end of the cable with respect to the connector and slide means for supporting the cable. The stop means is disposed spaced from the termination die and engages one end of the cable with the axial direction of the cable being generally normal to the longitudinal direction of the connector. The slide means is movable transversely of the axial direction of the cable between a loading position, wherein the cable engages the stop means, and a termination position, wherein the cable is positioned for termination in the connector by the die.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
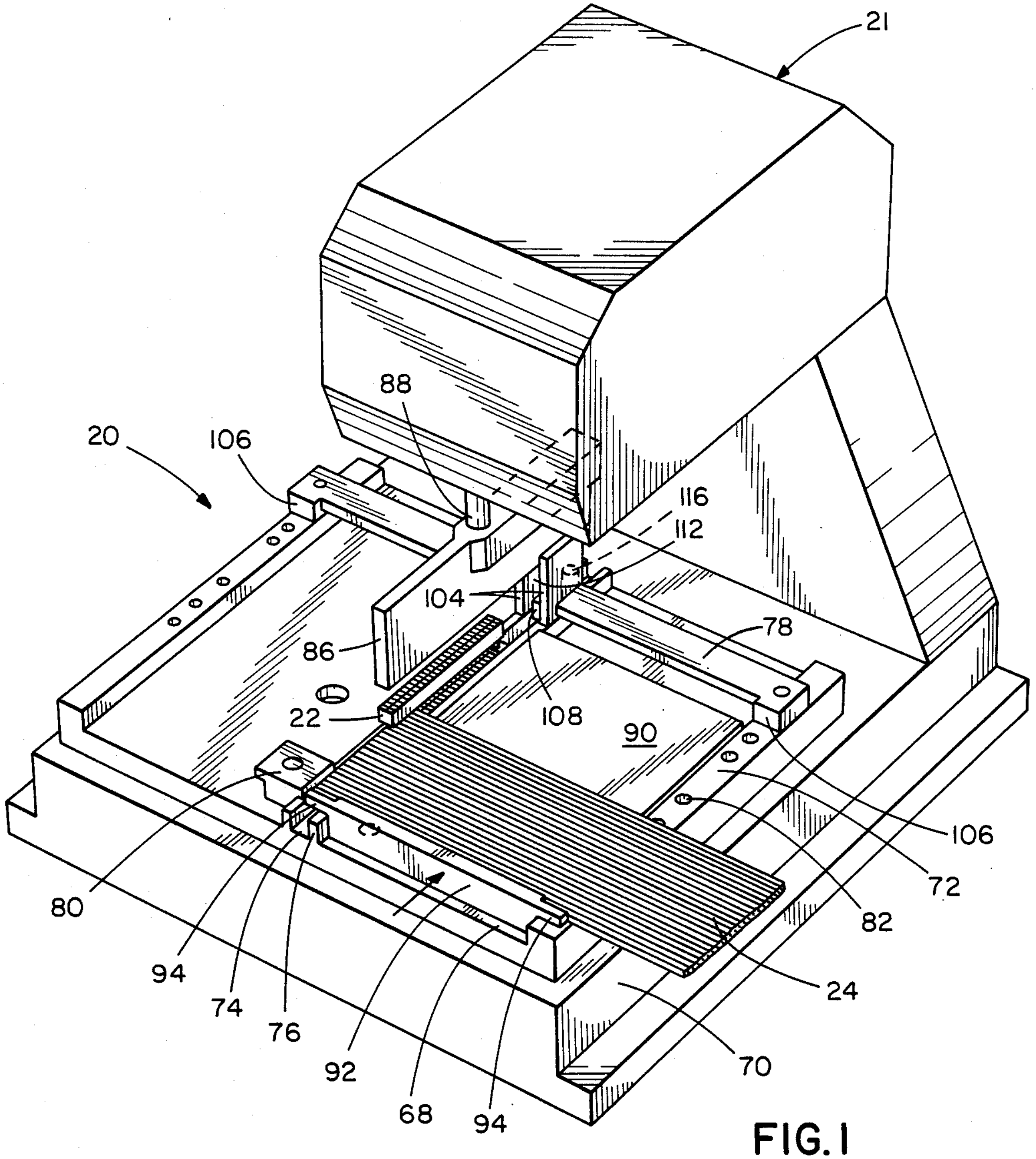
FIG. 1 is a perspective view of the tooling of the present invention mounted on a press, for termination of a flat cable with an insulation displacement connector.

Referring now to the drawings, termination tooling used with a prime mover (such as bench press 21) for applying mass termination insulation displacement flat cable connectors 22 is generally indicated in FIG. 1 by reference numeral 20. The term "prime mover" is used in its broad sense and is intended to include any means for supplying or amplifying force used in the termination of connectors 22. Such prime movers include pneumatic, hydraulic and manual presses. The tooling functions to apply connectors, one at a time, to a length of flat cable 24 in which a plurality of regularly spaced conductors 26 are embedded in a generally planar sheet of insulation having web portions 28 disposed between adjacent conductors. Termination tooling 20 is adapted to apply connectors adjacent the ends of the cable to effect end terminations and to apply connectors intermediate the cable ends when a daisy chain termination is desired.

Figure 2:
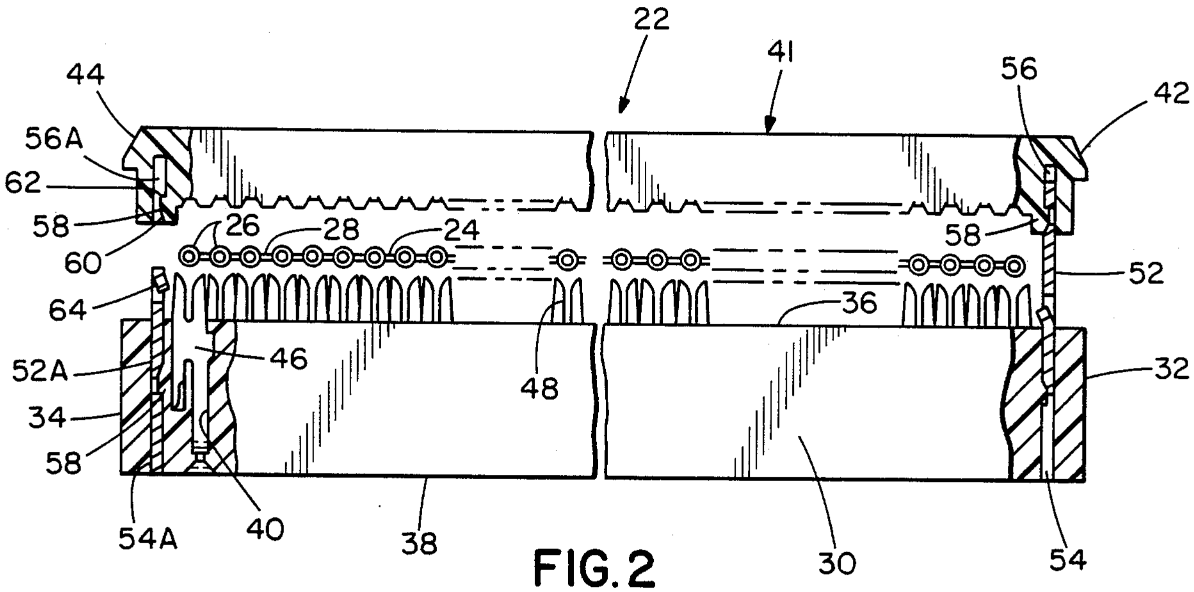
FIG. 2 is a front elevational view of the connector in its insertion position.
Figure 3:
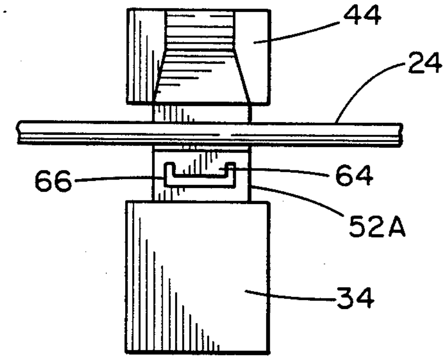
FIG. 3 is an end view of the connector of FIG. 2.
Figure 4:
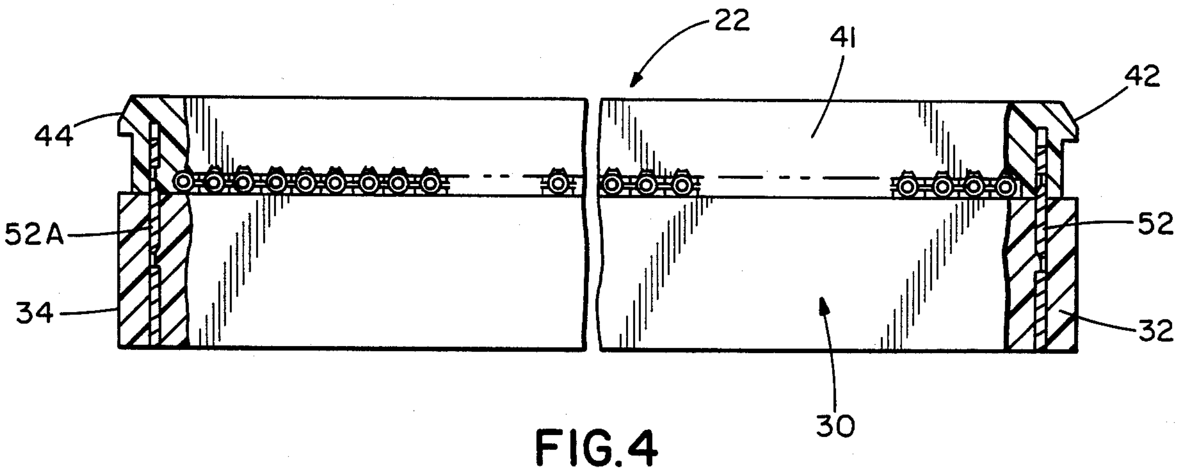
FIG. 4, similar to FIG. 2, shows the connector in its termination position.

Connector 22 is best shown in FIGS. 2–4 and includes an elongate insulative base 30 having a first end, 32, a second end 34, a top surface 36, a bottom surface 38 and an array of terminal element receiving apertures 40 corresponding in number to the flat cable conductors and extending through the top and bottom surfaces. Apertures 40 are preferably arranged in two rows with adjacent apertures in each row being offset to match the spacing of the flat cable conductors. Connector 22 also comprises an insulative cover 41 overlaying the base and has a first end 42 and a second end 44. Base 30 carries a metallic terminal element 46 in each aperture 40. Each element includes a pin receiving portion disposed within the base for engaging another electrical component inserted past the bottom surface of the base, and an insulation displacement conductor termination portion 48 extending beyond the top surface toward cover 41. The conductor termination portion is bifurcated to form a conductor-receiving slot and is sharply pointed to pierce the flat cable web and engage a corresponding conductor of a flat cable upon relative movement of said flat cable and said base toward one another.

The connector also includes interconnection means joining the base and cover adjacent their respective first ends 32, 42. The interconnection means includes a first generally planar metallic clip 52 disposed in an interference fit in a through opening 54 in the base and in a closed ended opening 56 in the cover. As shown in FIG. 2, clip 52 holds the cover and base in an insertion position wherein the spacing between the terminal elements and the cover is sufficient for passage of flat cable 24.

The respective second ends 34, 44 of the base and cover also have openings 54A and 56A; however the clip 52A, which constitutes a second interconnection means, disposed at the second end of the connector is positioned, in the insertion position of the connector, to extend fully through said base so that it is spaced sufficiently from the cover to permit passage of a flat cable past the second end of the connector. Thus when the connector is in its insertion position, a flat cable can be inserted laterally of its axial direction from the second end of the connector.

The base and cover are relatively movable from the insertion position to a termination position, shown in FIG. 4, wherein the overall height of connector 22 is reduced and the various conductors of the flat cable are electrically and mechanically terminated in corresponding terminal elements. The connector also comprises latch means for holding the connector in its termination position. Each opening 54, 54A, 56 and 56A has an internal tooth 58 having a ramp surface 60 and an abutment surface 62. Also, each clip has a pair of spaced converging resilient tongues 64 defined by "U" shaped windows 66 with the tongues being bent slightly to extend from the plane of the clip to engage a corresponding internal tooth. As the connector is moved toward its termination position, clip 52 advances into opening 54 until the lower tongue passes the abutment surface of the tooth in opening 54. Also, clip 52A advances into second end cover opening 56A causing the upper tongue to be deflected by the ramp surface of the opening 56A tooth until that tongue passes the abutment surface of that tooth. As shown in FIG. 4, when the connector has moved to its termination position, each clip tongue is facing a corresponding tooth abutment surface to prevent opening of the connector.

Figure 5:
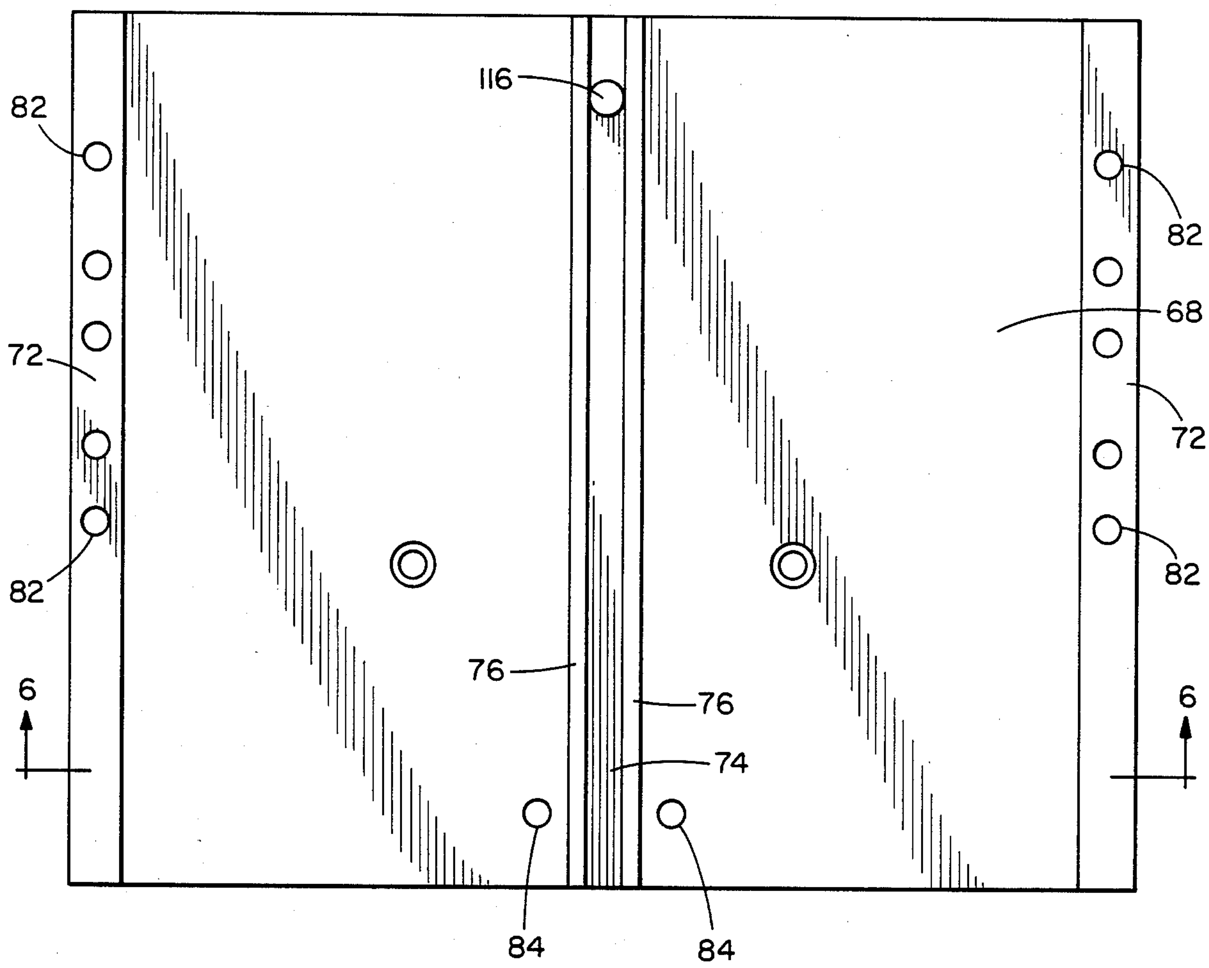
FIG. 5 is a plan view of the base of said tooling.
Figure 6:
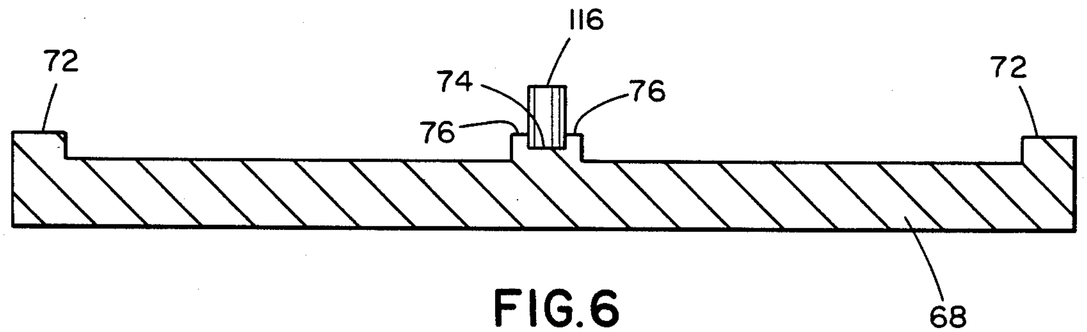
FIG. 6 is a sectional view taken generally along line 6—6 of FIG. 5.

Referring to FIGS. 1, 5 and 6, termination tooling 20 includes a base 68 for mounting on the bed 70 of bench press 21. The base 68 has side walls 72 and includes means for positioning a connector 22 in alignment with a termination die 86 attached to bench press rod 88. The positioning means comprises a channel 74 for holding a connector and guiding the connector in position for termination beneath die 86. The channel is defined by base intermediate walls 76 which extend generally parallel with respect to side walls 72. Upon operation of the press, a connector positioned in channel 74 under die 86 is moved to its termination position shown in FIG. 4.

Tooling 20 also includes slide means for supporting the cable 24 and stop means, disposed spaced from termination die 86, for engaging one end of the flat cable with the axial direction of the cable being generally normal to the longitudinal direction of a connector disposed in the channel. Thus the stop means, which comprises cable stop 80, functions to locate the cable end with respect to the connector.

Figure 7:
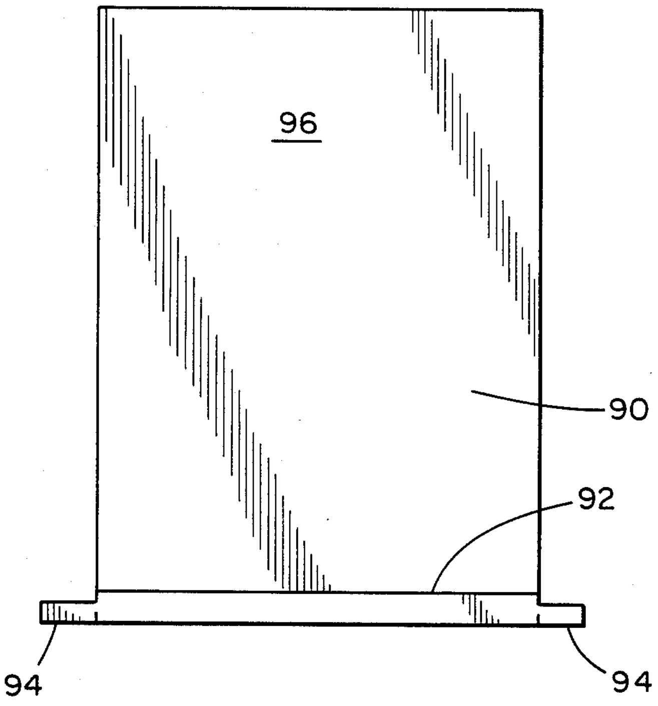
FIG. 7 is a plan view of a generally rectangular flat cable tray slidably carried by the base.
Figure 9:
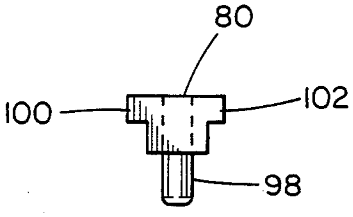
FIG. 9 is a front elevational view of a cable stop carried by the base.

More specifically, the slide means comprises a generally rectangular cable tray 90, best shown in FIGS. 1 and 7, which is slidably received and guided on base 68 between one of the side walls 72 and its facing intermediate wall 76. Tray 90 carries a lip 92 for engaging a side of the cable and a pair of oppositely extending fingers, disposed adjacent but offset with respect to the operative surface of lip 92, for pushing a connector disposed in channel 74 toward die 86. With the tray disposed on the base between a side wall and an intermediate wall, one of the fingers 94 extends to overlie channel 74. The spacing between the surface of lip 92 engageable with the cable and the surface of a finger 94 for engaging a connector, measured in the longitudinal direction of channel 74, is analogous to the spacing between the end of the connector and the terminal element closest thereto. Lip 92 and finger 94 constitute, in part, alignment means for aligning and maintaining alignment of the various terminal elements of connector 24 with corresponding flat cable conductors 26 during movement of cable tray 90 from a loading position, shown in FIG. 1, to a termination position wherein the cable and connector are disposed in position for termination by die 86.

Cable stop 80 includes a dependent mounting pin for reception in one of a pair of stop locating apertures 84 in base 68 adjacent channel 74 and remote from termination die 86. Due to the symmetry of base 68 about the longitudinal axis of channel 74 and the movability of tray 90 and stop 80 from side to side of the base, it will be appreciated that the tooling of the present invention is adapted to terminate either end of the cable. Furthermore, with the stop and tray removed from the base, a daisy chain termination can be completed closely adjacent a previously terminated connector, as suggested in FIG. 6, as space for that connector is provided between a side wall 72 and a facing intermediate wall 76 due to the removal of the tray.

Cable stop 80 has a square cross section which cooperates with the adjacent wall 76 of channel 74 to prevent rotation of the stop once it is seated in an aperture 84. The stop has a first stop arm 100 extending sufficiently to locate the cable end slightly inside the connector envelope projected in the longitudinal direction of channel 74 to effect a termination in which the cable end is recessed with respect to the connector edge. Stop 80 is provided with an opposing shorter second stop arm 102 for locating the cable so that upon movement of the slide to its termination position, the cable end will be generally flush with the connector edge.

Figure 8:
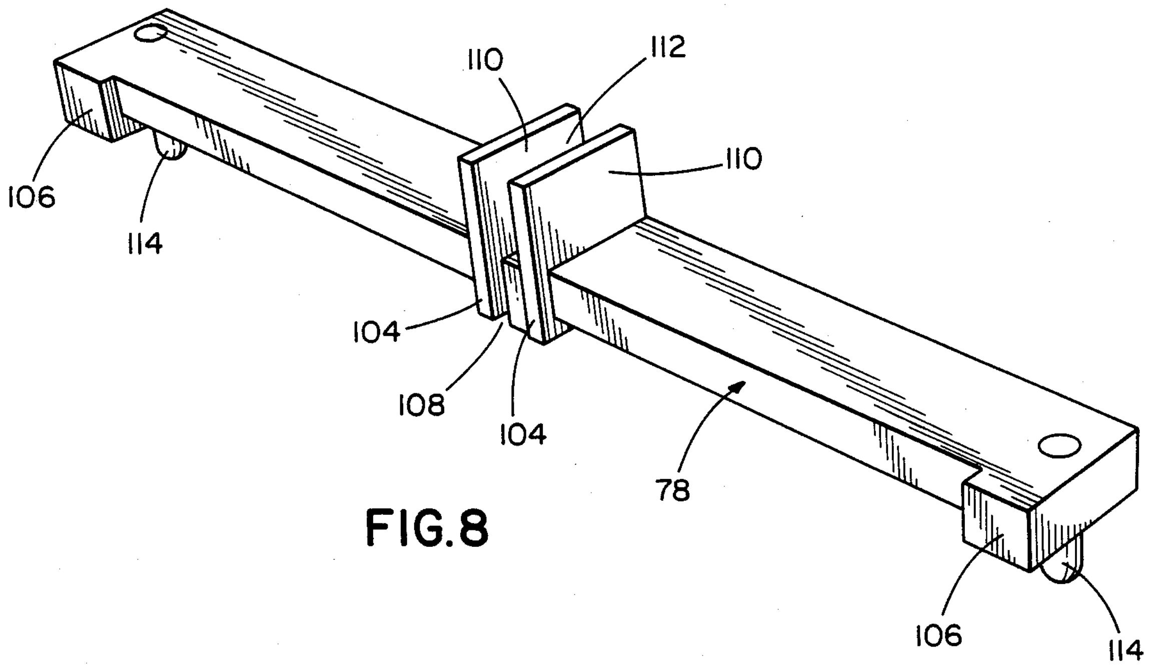
FIG. 8 is a perspective view of a back wall mountable at spaced locations on the base.

Referring to FIGS. 1 and 8, termination tooling further comprises a movable back wall 78 mountable at spaced locations on the base to limit movement of the cable and connector with respect to the termination die. The back wall 78 includes a pair of outer cable stops 106, a pair of inner cable stops 104 defining a recess 108 for receiving a connector end, and a pair of parallel extensions 110 defining a die-receiving channel 112. A connector having its end disposed is recess 108 is aligned for termination with a flat cable engaging cable stop 104, 106. The back wall 78 carries dependent mounting pins 114 adjacent its ends. Base side walls 72 are each provided with a series of back wall locating apertures 82 with one from each side wall adapted to receive one of a pair of receiving pins 114 to mount the back wall at spaced locations on the base with the wall extending normal to channel 74.

The movability of back wall 78 relative to bench press rod 88 permits adjustment of positioning of a connector in response to its length. That is, depending upon the length of the connector to be terminated, the back wall can be moved to locate the connector to present an approximated balanced load to rod 88. This tends to prevent tipping of die 86 as rod 88 extends to terminate the cable in the connector. The channel preferably carries a leveling means in the form of standard 116 located behind back wall 78 (relative to the orientation of the tooling shown in FIG. 1) for limiting movement of the rear portion of die 86 toward connector channel 74. Standard 116 is of sufficient length to prevent the rear portion of the die from dropping closer to the channel than it would if a terminated connector were disposed in the rear portion of the channel. Except for the presence of standard 116, the rear end of the termination die might move closer to the channel during termination causing the die to become canted with the result that the forward end of the connector is not moved sufficiently to terminate conductors in the flat cable.

Operation of the tooling of the present invention is as follows: Assuming it is desired to effect a recessed termination to the left end of cable 24, stop 80 is located using left locating aperture 84 disposed with longer first stop arm 100 extending partially over channel 74. With the cable tray 90 in its loading position and overlapping with stop 80, a connector 22 is loaded into channel 74 inverted—with base 30 overlying cover 41—and with the open or second end of the connector facing stop 80. After the cable 24 is placed on tray 90 with one side against lip 92 and the left end in engagement with stop arm 100, the tray is moved toward its termination position by the operator merely placing his fingers on the top of the cable and pushing the tray backwardly. It will be appreciated that the coefficient of friction between the cable and the top surface 96 of the tray is much greater than that between the tray and base 68. Accordingly, there will be no relative movement between the cable and tray as they move toward the die, and the positioning of the left cable end relative to the connector normal to the longitudinal direction of channel 74 will remain constant. It will be appreciated that the scope of the present invention includes the provision of a cable clamp carried by the tray.

During movement of the tray toward the die, the connector will be engaged by, aligned with the cable, and moved toward the die by left connector finger 94. As this occurs "on the fly", the tooling of the present invention is extremely fast in operation, limited chiefly by the dexterity of the operator. Continued movement of the tray causes the tray to reach its termination position in which the closed or first end of connector 22 is received in back wall recess 108 and the back side of the cable engages right side back wall stops 104 and 106. Operation of the press effects a termination in which the left cable end is recessed with respect to the connector edge. Upon return of die 86 to its retracted position, the tray is moved toward its loading position and the completed termination removed from channel 74. It will be appreciated that the tooling can fabricate recessed terminations because cable stop 80 remains remote from termination die 86 so it will not interfere with operation of the die because it is out of the path of the die.

While the present invention has been illustrated with both the connector and cable being movable relative to each other and moved by the slide to the termination position, it will be appreciated that the connectors could be positioned by alternate means relative to the termination die and only the cable moved into position by the slide. Alternatively, the cable could be positioned in a connector and both the cable and connector moved to the termination position without permitting movement of the cable transversely of its axial direction relative to movement of the connector.

Tooling 20 is highly versatile. To make a termination in which the cable end is substantially flush with the connector edge, the cable stop is merely repositioned with shorter second stop arm 102 extending toward the cable end to be located. The right end of cable 24 can be terminated by moving the tray to the left side of the base and the stop to the right side. To form a daisy chain termination, the stop and tray are simply removed from the base. When a termination is to be made closely adjacent an installed connector, space for the connector body is provided by the depression between side wall 72 and facing intermediate wall 76. The back end of that connector is received in the recess formed in the back wall between an inner cable stop 104 and its corresponding outer cable stop 106.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Termination tooling adapted for use with a prime mover, such as a bench press, for terminating a flat cable in an elongate connector, said connector comprising an insulative base and an insulative cover having a plurality of spaced insulation displacement metallic terminal elements extending toward said cover and corresponding in number and position to the conductors of said flat cable, said tooling comprising:

a termination die for terminating said cable in said connector;

positioning means for holding a connector in place for termination by said die;

stop means disposed spaced from said termination die for engaging one end of said flat cable with the axial direction of said cable being generally normal to the longitudinal direction of said connector to locate said end with respect to said connector; and slide means for supporting said cable, said slide means being movable transversely of the axial direction of said cable between a loading position, wherein said cable engages said stop means, and a termination position, wherein said cable is positioned for termination in said connector by said die, whereby said cable is positioned with respect to said connector without said stop means engaging said cable during termination.

2. Termination tooling as set forth in claim 1 wherein said cover and base of said connector have respective first and second ends and further have an insertion position wherein the spacing between said elements and cover is sufficient to permit insertion of said cable therebetween, said cover and base being relatively movable to a connector termination position wherein said cover and base are closer to one another than in said insertion position and each terminal element engages its corresponding flat cable conductor, a pair of corresponding ends of said cover and base in said insertion position forming an open end of said connector to enable a cable to be inserted into said connector past said open end.

3. Termination tooling as set forth in claim 1 wherein said positioning means comprises a channel for holding a connector and guiding said connector into position for termination by said die.

4. Termination tooling as set forth in claim 3 wherein said slide means comprises alignment means for aligning and maintaining alignment of the various terminal elements of a connector with corresponding flat cable conductors upon movement of said slide means.

5. Termination tooling as set forth in claim 4 wherein said alignment means comprises a lip for engaging a side of said flat cable, and further comprising a finger extending over said channel for pushing a connector toward said die, the spacing between said lip and said finger normal to the axial direction of said cable being analogous to the spacing between an end of said connector and the terminal element closest thereto.

6. Termination tooling as set forth in claim 1 wherein said stop means is adjustable and comprises first means for locating said cable end recessed with respect to the envelope of said connector, said stop means further comprising second means for locating said cable end substantially flush with said connector envelope.

7. Tooling as set forth in claim 3 further comprising a base having side walls, said base carrying said channel intermediate and generally parallel with respect to said side walls.

8. Tooling as set forth in claim 7 wherein said base is substantially symmetrical about the longitudinal center line of said channel.

9. Tooling as set forth in claim 7 wherein said slide means comprises a generally rectangular tray, said channel being defined by a pair of intermediate walls, said tray being received between and guided by one of said side walls and the intermediate wall facing said side wall.

10. Tooling as set forth in claim 7 wherein said termination die is carried by the rod of said bench press, said tooling further comprising a back wall mounted on said base for limiting movement of said connector and said cable.

11. Tooling as set forth in claim 10 wherein said tooling includes means for mounting said back wall at spaced locations with respect to said rod whereby, depending upon the length of the connector to be terminated, the back wall can be moved to locate the connector to present an approximated balanced load to said rod.

12. Termination tooling adapted for use with a prime mover, such as a bench press, for terminating flat cable in an elongate connector, said connector comprising an insulative base and an insulative cover having a plurality of spaced insulation displacement metallic terminal elements extending toward said cover and corresponding in number and position to the conductors of said flat cable, said tooling comprising:

a termination die for terminating said cable in said connector;

positioning means for positioning a connector in position for termination by said die;

slide means for moving said cable transversely of its axial direction into position for termination; and stop means positioned adjacent said slide means for engaging said flat cable and locating said flat cable in a predetermined position relative to said connector, said slide means being movable relative to said stop means, said stop means being spaced from said termination die whereby said flat cable can be moved into position for termination in a predetermined position relative to said connector without said stop means engaging said cable during termination.

13. Termination tooling adapted for use with a prime mover, such as a bench press, for terminating flat cable in an elongate connector, said connector comprising an insulative base and an insulative cover having a plurality of spaced insulation displacement metallic terminal elements extending toward said cover and corresponding in number and position to the conductors of said flat cable, said tooling comprising:

a termination die for terminating said cable in said connector;

channel means for holding a connector and guiding said connector into position for termination by said die;

slide means for moving said cable, transversely of its axial direction, and moving said connector, in its longitudinal direction, into position for termination, said slide means comprising alignment means for aligning and maintaining alignment of the various terminal elements with corresponding flat cable conductors upon movement of said slide means; and a base and a wall mounted on said base for limiting movement of one of said connector and said flat cable with respect to said die, said slide being mounted on said base, said wall comprising means to enable said wall to be moved to spaced locations on said base.

14. Termination tooling adapted for use with a prime mover, such as a bench press, for terminating flat cable in an elongate connector, said connector comprising an insulative base and an insulative cover with said base having a plurality of spaced insulation displacement metallic terminal elements extending toward said cover and corresponding in number and position to the conductors of said flat cable, said cover and base having respective first and second ends and further having an insertion position wherein the spacing between said elements and cover is sufficient to permit insertion of said cable therebetween, said cover and base being relatively movable to a connector termination position wherein said cover and base are closer to one another than in said insertion position and each terminal element engages its corresponding flat cable conductor, said tooling comprising:

an elongate termination die for moving said connector to its termination position;

positioning means comprising a connector receiving channel for positioning said connector with respect to said die; and leveling means including a standard carried by said channel for limiting movement of said die toward said channel and for preventing said die from being canted upon completion of movement of said die.

15. Termination tooling adapted for use with a prime mover, such as bench press, for terminating flat cable in an elongate connector, said connector comprising an insulative base and an insulative cover having a plurality of spaced insulation displacement metallic terminal elements extending toward said cover and corresponding in number and position to the conductors of said flat cable, said tooling comprising:

a termination die for terminating said cable in said connector;

channel means for holding a connector and guiding said connector into position for termination by said die;

slide means for moving said cable, transversely of its axial direction, and moving said connector, in its longitudinal direction, into position for termination, said slide means comprising alignment means aligning and maintaining alignment of the various terminal elements with corresponding flat cable conductors upon movement of said slide means; and a base and a wall mounted on said base for limiting movement of one of said connector and said flat cable with respect to said die, said wall having a channel for receiving said die.

16. Termination tooling adapted for use with a prime mover, such as a bench press, for terminating a flat cable in an elongate connector, said connector comprising an insulative base having a plurality of spaced insulation displacement metallic terminal elements corresponding in number and position to the conductors of said flat cable, said tooling comprising:

a termination die for terminating said cable in said connector;

positioning means for holding a connector in place for termination by said die;

stop means disposed spaced from said termination die for engaging one end of said flat cable with the axial direction of said cable being generally normal to the longitudinal direction of said connector to locate said end with respect to said connector; and slide means for supporting said cable, said slide means being movable transversely of the axial direction of said cable between a loading position, wherein said cable engages said stop means, and a termination position, wherein said cable is positioned for termination in said connector by said die, whereby said cable is positioned with respect to said connector without said stop means engaging said cable during termination.

17. Termination tooling as set forth in claim 16 wherein said cover and base of said connector have respective first and second ends and further have an insertion position wherein the spacing between said elements and cover is sufficient to permit insertion of said cable therebetween, said cover and base being relatively movable to a connector termination position wherein said cover and base are closer to one another than in said insertion position and each terminal element engages its corresponding flat cable conductor, a pair of corresponding ends of said cover and base in said insertion position being connected and aother pair of corresponding ends of said cover and base forming an open end of said connector to enable a cable to be inserted into said connector past said open end.

* * * * *